(12) United States Patent
Koopman, Jr.

(10) Patent No.: US 12,037,020 B2
(45) Date of Patent: Jul. 16, 2024

(54) METHODS AND SYSTEMS FOR IMPROVING PERMISSIVENESS WHILE ENSURING THE SAFETY OF AN AUTONOMOUS VEHICLE

(71) Applicant: Edge Case Research, Inc., Pittsburgh, PA (US)

(72) Inventor: Philip J. Koopman, Jr., Pittsburgh, PA (US)

(73) Assignee: EDGE CASE RESEARCH, Pittsburgh, PA (US)

( * ) Notice: Subject to any disclaimer, the term of this patent is extended or adjusted under 35 U.S.C. 154(b) by 431 days.

(21) Appl. No.: 17/420,670

(22) PCT Filed: Jan. 3, 2020

(86) PCT No.: PCT/US2020/012233
§ 371 (c)(1),
(2) Date: Jul. 3, 2021

(87) PCT Pub. No.: WO2020/142721
PCT Pub. Date: Jul. 9, 2020

(65) Prior Publication Data
US 2021/0387647 A1    Dec. 16, 2021

Related U.S. Application Data

(60) Provisional application No. 62/787,838, filed on Jan. 3, 2019.

(51) Int. Cl.
*B60W 60/00*    (2020.01)
*B60W 40/02*    (2006.01)
(Continued)

(52) U.S. Cl.
CPC ........ *B60W 60/0016* (2020.02); *B60W 40/02* (2013.01); *G06N 7/01* (2023.01); *B60W 2400/00* (2013.01); *B60W 2555/20* (2020.02)

(58) Field of Classification Search
CPC ............ B60W 60/0016; B60W 40/02; B60W 2555/20; G06N 7/01
(Continued)

(56) References Cited

U.S. PATENT DOCUMENTS

| | | | |
|---|---|---|---|
| 6,907,591 B1 * | 6/2005 | Teig ...................... | G06F 30/367 716/136 |
| 11,112,797 B2 * | 9/2021 | Bin-Nun ................ | G07C 5/085 |

(Continued)

FOREIGN PATENT DOCUMENTS

| | | | | |
|---|---|---|---|---|
| EP | 2915718 A1 | | 9/2015 | |
| EP | 3659886 A1 * | | 6/2020 | ............ B60W 10/04 |
| GB | 2419430 A * | | 4/2006 | ............ B60K 31/00 |

OTHER PUBLICATIONS

Ian et al., "An Automated Vehicle Safety Concept Based on Runtime Restriction of the Operational Design Domain," 2018, Publisher: IEEE.*

(Continued)

*Primary Examiner* — Tuan C To

(57) ABSTRACT

A method is disclosed for improving the permissiveness of a vehicle designed to operate within an operational design domain ("ODD") where the vehicle has an autonomous vehicle control system capable of collecting sensor data. The method, which can be incorporated into a system or into instructions placed on storage media, includes partitioning the ODD into subsets ("micro-ODDs") that relate to different operational situations and creating safety envelopes for those subsets. The safety envelopes are used to keep the vehicle operating safely and can be optimized to improve permissiveness of the vehicular operation.

23 Claims, 6 Drawing Sheets

(51) Int. Cl.
*G06N 7/00* (2023.01)
*G06N 7/01* (2023.01)

(58) Field of Classification Search
USPC .......................................................... 701/36
See application file for complete search history.

(56) References Cited

U.S. PATENT DOCUMENTS

| | | |
|---|---|---|
| 2012/0203419 A1 | 8/2012 | Tucker et al. |
| 2013/0325258 A1 | 5/2013 | Cooper et al. |
| 2017/0102701 A1 | 4/2017 | Pack et al. |
| 2018/0074501 A1* | 3/2018 | Boniske ............... G05D 1/0055 |
| 2018/0272963 A1 | 9/2018 | Meyhofer et al. |
| 2018/0290652 A1 | 10/2018 | Kindo |
| 2019/0072960 A1* | 3/2019 | Lin ....................... B60W 40/09 |
| 2019/0163185 A1* | 5/2019 | Bin-Nun ............... B60W 40/09 |
| 2019/0384292 A1* | 12/2019 | Aragon ................ B60W 50/00 |
| 2020/0172116 A1* | 6/2020 | Zhu ....................... B60W 10/04 |

OTHER PUBLICATIONS

Colwell, I., "Runtime Restriction of the Operational Design Domain: A Safety Concept for Automated Vehicles," A thesis presented to the University of Waterloo, Jan. 2018, 90 pages.
Extended European Search Report for Application No. EP20735911.8 mailed on Aug. 30, 2022, 8 pages.
International Search Report in PCT/US2020/012233 mailed Mar. 17, 2020.

* cited by examiner

METHODS AND SYSTEMS FOR IMPROVING PERMISSIVENESS WHILE ENSURING THE SAFETY OF AN AUTONOMOUS VEHICLE

CROSS REFERENCE TO RELATED APPLICATIONS

This application is an international application that claims priority from U.S. Provisional Application Ser. No. 62/787,838 entitled "METHOD AND APPARATUS FOR IMPROVING PERMISSIVENESS WHILE ENSURING SAFETY IN AN AUTONOMOUS VEHICLE" filed Jan. 3, 2019, the entire specification of which is incorporated by reference herein.

FIELD OF THE INVENTION

The invention relates to novel approaches for managing the operation of an autonomous vehicle. More particularly, the invention relates to methods and systems for improving the permissiveness of autonomous cars, trucks, aircrafts, or other similar vehicles through the implementation of a computer-based system that relaxes safety constraints when appropriate without sacrificing overall operational safety.

BACKGROUND OF THE INVENTION

Autonomous vehicles (generically, AVs, which include but are not limited to cars, trucks, buses, special purpose ground vehicles, underwater vehicles, drones and other air vehicles) use computer-based controls to automate at least some aspects of vehicle operation. Perhaps the most familiar of these include speed control and lane keeping. In addition to more conventional sensors, such as speed sensors, AVs commonly rely upon external environmental sensors, such as cameras (visible light, infrared), LIDAR, radars, ultrasound acoustic sensors, and the like to provide data to perception systems (e.g., detection, classification, and prediction of aspects of the operational environment such as vehicles, pedestrians, other objects, roadway, infrastructure, and weather). A human can be part of an AV control system, either as part of moment-to-moment vehicle control (e.g., a human being steers the vehicle while the vehicle maintains speed) or as a supervisor of autonomy safety, or the vehicle can be entirely autonomous.

Regardless of the level of involvement for the human, including, without limitation, completely human-driven vehicles, it is advantageous to have an automated monitor to determine if the vehicle is operating in a safe manner. One strategy for attempting to build such a monitoring capability is to use a perception-based Driver Performance Monitoring System (DPMS), such as the Mobileye Advanced Driver Assistance System (MADAS) by Mobileye Vision Technologies LTD. of Jerusalem, Israel, for real time collision avoidance. Such systems use similar perception capabilities to those in an AV to determine whether a vehicle is being driven in a safe manner. For example, a DPMS might monitor the following distance between a leading vehicle and the vehicle being protected (the "ego" vehicle) and provide an alert or take control if the distance is determined to be too close to be safe, based on vehicle speed and distance between the vehicles, for example.

The following distances that are deemed "safe" for such systems might be determined by a fixed rule-of-thumb following distance (e.g., the 2-second following rule commonly discussed in beginner driver license training materials). Alternately, the following distance might be monitored using a more specific algorithmic approach, such as a Responsibility-Sensitive Safety (RSS) algorithm, which requires additional information such as road geometry and operational factors. Systems that employ RSS may not, however, take into account environmental situations that can transform an otherwise safe system into an unsafe one, even though the system may be following RSS safety rules.

Other automated safety systems have to optimize operational behavior in specific situations, such as following another vehicle at speed on a highway, but they have not heretofore taken full advantage of all of the available data and information relevant to the actual situation, such as temperature, weather conditions or experiential data. As such, these safety systems have been designed with a one-size-fits-all approach that attempts to keep the vehicle safe for a wide range of possibilities, rather than for the specific set of circumstances the vehicle may currently be encountering, This approach results in a vehicle that people may never want to actually use due to overly cautious operation that is unsuitable for a majority of situations.

What is needed is a way of managing the operation of a vehicle by utilizing sensor data relating to both the state of the vehicle control system and the surrounding environment to create a baseline operational paradigm that is not only safe, but situationally permissive. Then, when the vehicle encounters a known set of conditions for which the system has been properly trained, the operational safety envelope for the vehicle can be enlarged to maximize performance under those conditions.

SUMMARY OF THE INVENTION

In a first aspect, a computer-implemented method for improving the permissiveness of a vehicle designed to operate within an operational design domain ("ODD") is provided. The ODD is partitioned into a plurality of subsets or "micro-ODDS" with each micro-ODD representing a different operational situation. A safety envelope comprising rules for allowable operational characteristics of the vehicle is then calculated for each of the micro-ODDs. Sensor data is received and is used to determine the current micro-ODD for the vehicle and the appropriate safety envelope rules are applied to its operation.

In certain embodiments, the operation of the vehicle is monitored for violations of the safety envelope and, when necessary, a vehicle safety function can be activated. In other embodiments a probabilistic model, such as a Bayesian model, is used to help determine the appropriate micro-ODD based at least on previously collected data, geographic location and weather conditions.

In certain other embodiments, the computer-implemented method further comprises calculating a new micro-ODD based on changes in data inputs and transitioning from the current micro-ODD to the new micro-ODD. The transitioning step comprises changing the operational characteristics of the vehicle so that they do not violate the new safety rules associated with the safety envelope for the new micro-ODD.

In still other embodiments, the computer-implemented method further comprises an optimizing step wherein the operational environment within a micro-ODD is expanded and the safety envelope recalculated until permissiveness is reduced by more than a predetermined threshold.

In a second aspect, a system for improving the permissiveness of a vehicle designed to operate within an operational design domain ("ODD") is provided. The system comprises a memory or other data storage facility and one or more processors that work in conjunction with one another in order to perform the steps of the method disclosed above.

In a third aspect, a non-transient computer-readable storage medium containing instructions that, when executed by a computer, cause the computer to perform a method for improving the permissiveness of a vehicle designed to operate within an operational design domain ("ODD") and having an autonomous vehicle control system that collects sensor data is provided. The instructions, when executed by a computer, perform the steps of the method disclosed above.

DETAILED DESCRIPTION OF THE DRAWINGS

Figure 1:
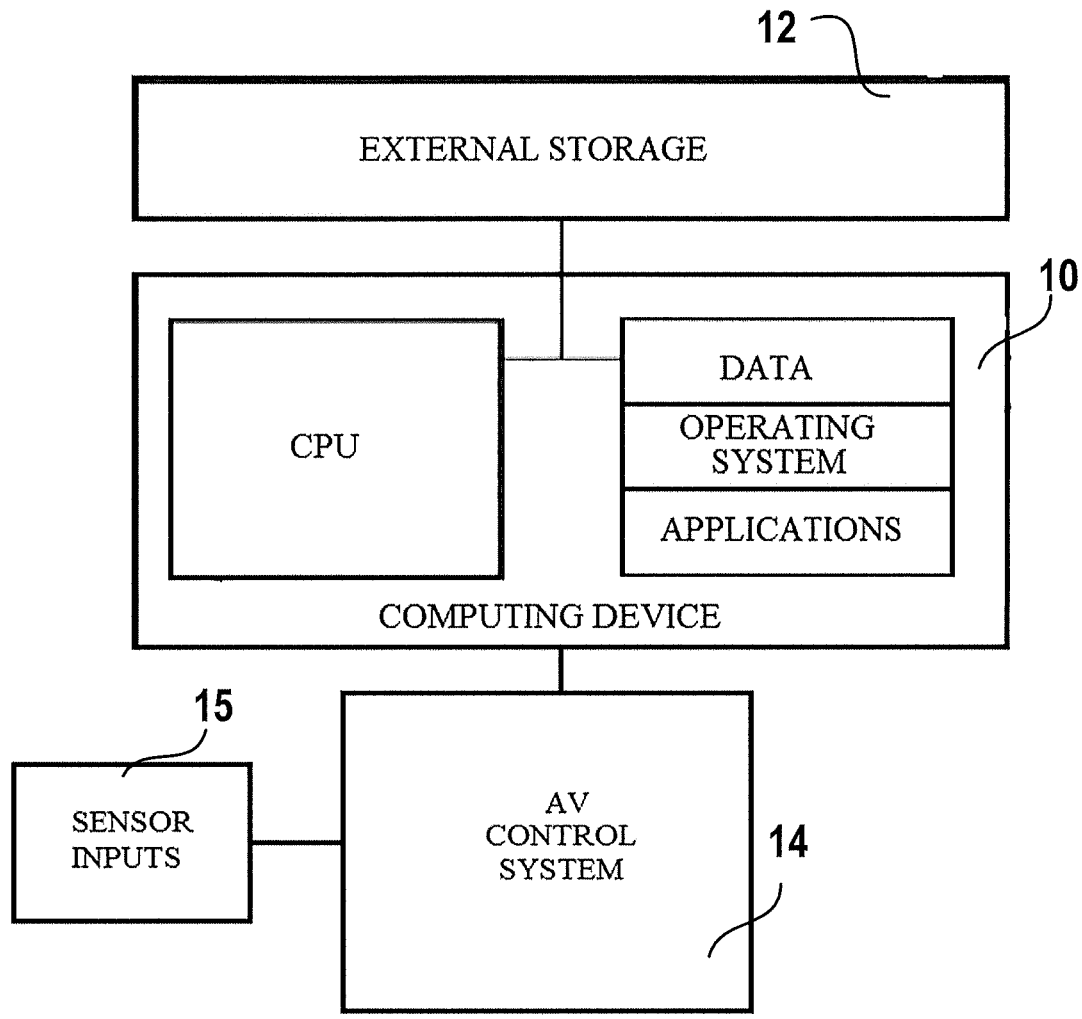
FIG. 1 is a block diagram of a configuration of a computer system that can implement the invention in accordance with an embodiment of this disclosure.

This disclosure is directed to an autonomous vehicle operation system that employs novel methods for managing the operation of autonomous and semi-autonomous vehicles in a safe manner Broadly, the set of all possible operational environments that the vehicle is designed to handle (the "Operational Design Domain" or "ODD") is subdivided into subsets ("micro-ODDs") that represent different types of operational environments. Each micro-ODD includes factors, such as geographic location, operational scenarios (e.g., roadway geometry and position and motion of other vehicles), and weather. The factors can be described in terms of summaries. Example micro-ODD summaries include "sunny weather on downtown city streets in Pittsburgh" and "rainy weather on interstate highway I-80 in Pennsylvania."

Rather than assigning different operational characteristics for a vehicle for differing micro-ODDs, the system is designed so the vehicle can operate safely in all micro-ODDs as a baseline, but with permissiveness built in. As an example of permissiveness, when it can be determined that the vehicle is within a certain known micro-ODD, performance (e.g. speed) can be optimized for the micro-ODD without compromising safety.

In certain embodiments, a safety envelope is derived for a worst-case operational point within each micro-ODD. During vehicle operation, a probabilistic model or algorithm, such as a Bayesian model or algorithm, can be used to select the currently active micro-ODD. Then, the micro-ODD activates the corresponding set of safety envelopes to provide maximum permissiveness consistent with proven safety given the micro-ODD selected to represent the current operational environment. Permissiveness is the degree to which the vehicle is allowed freedom of operation without violating any safety constraints. A large safety envelope provides high permissiveness, while a small safety envelope provides low permissiveness. As an example, a vehicle mode that can operate safely at speeds up to 50 mph has more speed permissiveness than a vehicle mode that can only ensure safety at speeds up to 25 mph.

A micro-ODD transition manager uses the current micro-ODD state and sensor inputs to transition between micro-ODDS as the vehicle moves about the world. A behavioral violation detector detects safety envelope violations based on rules (safety envelope definitions) that are enforced responsive to the current micro-ODD state.

As stated, each micro-ODD has a predetermined worst-case point within the boundaries of that micro-ODD for which the safe operation of the AV has been proven, resulting in proof that the safety envelopes associated with each of the micro-ODDs ensure safety, so long as the selected micro-ODD and corresponding safety envelope actually corresponds to the environment. A Bayesian probabilistic approach to micro-ODD selection uses a prior set of expectations in relation to the current micro-ODD to guide the selection of a transition to a subsequent micro-ODD as conditions or operational situations change. Special transition safety envelope definitions are used to ensure safety or best effort reasonable behavior during the transitions between micro-ODDs with potentially incompatible safety envelopes.

Figure 2:
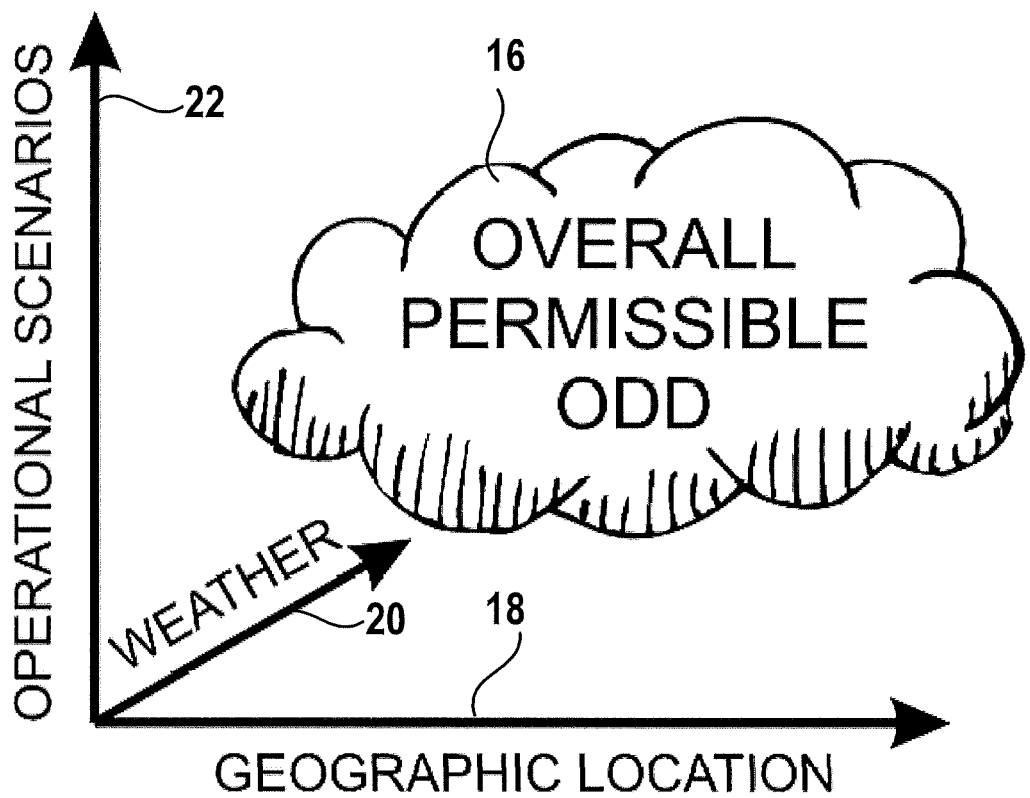
FIG. 2 is an illustration of an exemplary notional representation of a permissible ODD for a particular AV.

FIGS. 1-2 illustrate an AV computer system, generally designated by the numeral 10. The AV computer system 10 can be coupled to an external storage device 12 and configured to implement an AV control system 14 having a plurality of sensor inputs 15 and an ODD 16. In this exemplary embodiment, the ODD 16 can have a plurality of factors designated on a geographic location axis 18, a weather axis 20, and an operational scenarios axis 22.

The ODD 16 can represent the state space of the external environment within which the vehicle operates. The overall permissible ODD 16 represents a set of all cross-product axis values for which the system is designed to operate. The AV control system 14 is not intended to operate outside the ODD 16, so that the ODD 16 represents the set of all conditions in which the vehicle is intended to operate.

The axes (i.e., the geographic location axis 18, the weather axis 20, and/or the operational scenarios axis 22) can be illustrated with unordered and/or relative categorical dimensions or sets of "bins" such as "wet" vs. "dry" weather, as opposed to ordered values. While three dimensions are shown in FIG. 2, there are, generally, additional dimensions that might be as relevant to the design of the system, such as whether the vehicle has entered a construction zone or a snow squall.

Safety envelopes, which are also implemented within the AV computer system 10, can be understood in relation to the ODD 16. A safety envelope is a boundary in the system state space which separates safe system states (i.e., inside the safety envelope) from unsafe system states (i.e., outside the safety envelope). Safety envelopes can be single dimensional (e.g., following distance) or multidimensional (e.g., a combination of speed and following distance), depending upon assumptions, desired system operational permissiveness, and environmental parameters. In certain embodiments, safety envelopes might be limited to partial safety assurance, which means that each safety envelope considers only a subset of factors that determine the full system state space with a set of safety envelopes in aggregate addressing a larger fraction of the state space.

Safety envelopes can depend both upon system state and upon the environmental context within which the system operates. In some embodiments, Newtonian mechanics can be used to determine a safe following distance behind a leading vehicle. In such embodiments, the safety envelope can be exited or violated when the following distance is too close. In other embodiments, safety envelopes can be determined via experiential or experimental methods, engineering estimation, or through "rules of thumb", so long as the resulting AV control system 14 is appropriately safe.

The distinction between the ODD 16 and the set of one or more safety envelopes is that the ODD 16 is defined with reference to the state of the environment, while safety envelopes are defined with reference to the state of the AV system. With this type of approach, a safe vehicle operates within the ODD 16 while staying within a defined safety envelope. This means that safe vehicles do not exceed safe limits that are placed upon the internal states of such vehicles while operating in the context of the ODD 16.

A significant limitation that must be placed upon systems that utilize safety envelopes is the inverse relation between the scope of the ODD 16 and permissiveness. As the ODD scope grows, permissiveness shrinks for a safety envelope that covers the whole ODD. Such limitations result from the tendency for safety envelopes to become more restrictive through the incorporation of worst-case limitations for every possible aspect of the system state space, even when worst-case limitations are seldom encountered in practice. By way of example, the following distance on a clear, dry road with passenger cars can be comparatively close if the reaction time to initiate ego vehicle-braking in response to a leader vehicle panic-braking event is quick. For a safety envelope that spans the whole ODD, the following distance must increase if the ODD 16 is expanded to include environmental conditions, such as visibility limitations, other sensor interference, icy road patches, mixed truck/car/motorcycle traffic, steep grades, and other similar conditions that call for a longer following distance to ensure safety. Such systems constrict the permissiveness of the vehicle with regard to safe following distance and potentially maximum speed by forcing the vehicle to act according to the worst conditions across the entire ODD 16 even if the current operational conditions are much more favorable.

Another significant limitation that must be placed upon conventional systems that utilize safety envelopes is that any proof of safety depends upon an environmental characterization (including characteristics of other vehicles). Such environmental characterization can be uncertain or even probabilistic. For example, road friction coefficient values as well as the speed and expected maximum braking deceleration characteristics of other vehicles is based on measurements and inferences that inherently have some level of inaccuracy and error.

Figure 3:
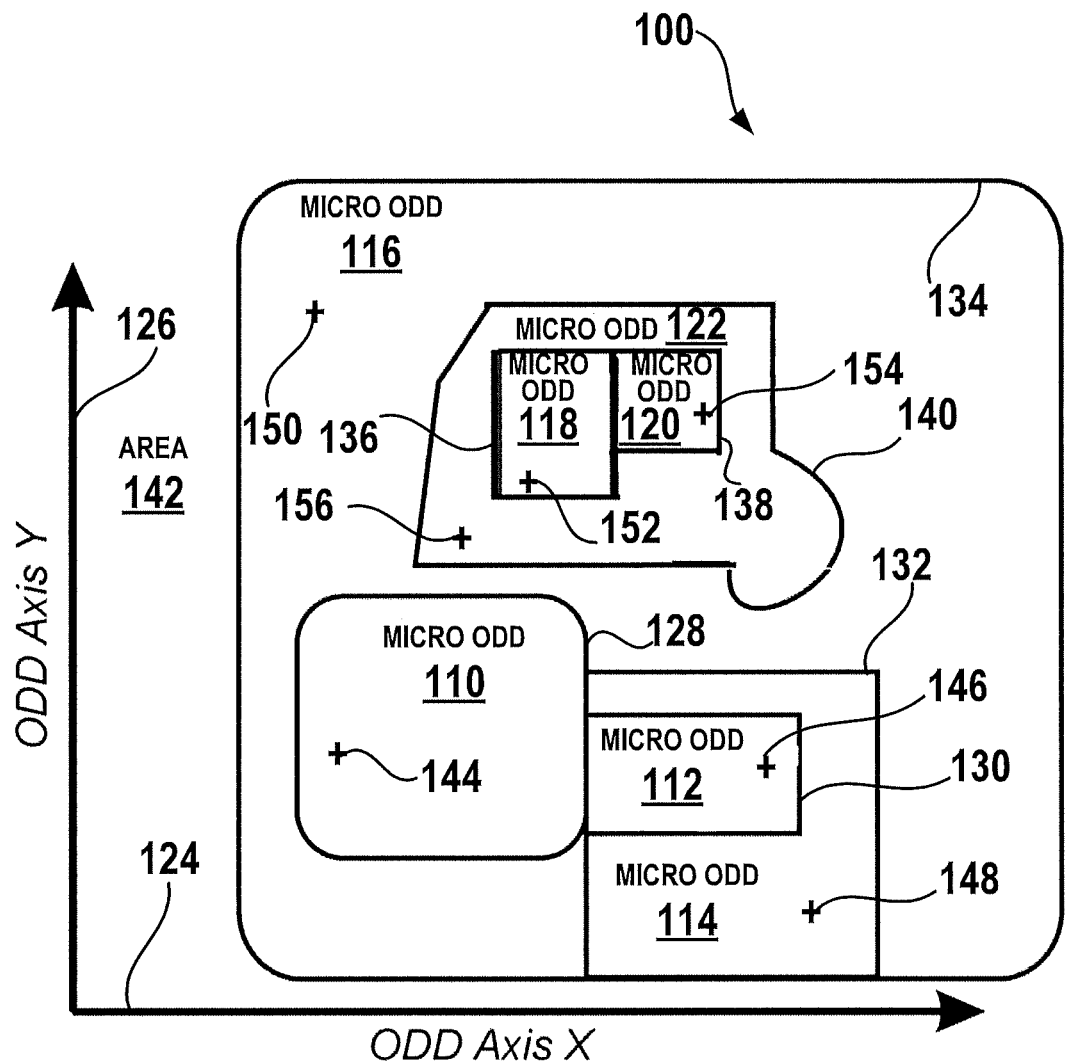
FIG. 3 is an illustration of an exemplary structure of an ODD partitioned into a plurality of defined micro-ODDs.

FIG. 3 illustrates an ODD, generally designated by the numeral 100, partitioned into a plurality of micro-ODDs 110-122. The ODD 100, like the ODD 16 shown in FIG. 2, is a multi-dimensional ODD that encompasses multiple factors. In this exemplary embodiment, the ODD 100 includes two dimensions that are set forth along two axes 124-126. The axis 124 represents dimension X. The axis 126 represents dimension Y.

The micro-ODDs 110-122 include outer boundaries 128-140 which delineate the extent of each micro-ODD. Micro-ODDs may partially or wholly overlap with other micro-ODDs. As an example, micro-ODD 114 is a subset of ODD 100, delineated by boundary 132. In turn, micro-ODD 112 is a further subset of micro-ODD 114, delineated by boundary 130. Micro-ODD 116 encompasses the entire ODD 100, with boundary 134 being identical to the boundary of ODD 100. Area 142, which is not covered by the micro-ODDs 110-122, is invalid and outside of the ODD 100.

The micro-ODDs 110-122 represent a subset of the ODD 100 that can have the following exemplary properties: (i) a set of boundaries that are defined and are a subset of the ODD 100; (ii) collectively covering the ODD 100 space; (iii) one or more of the micro-ODDs 110-122 being defined in terms of one or more ODD factors and including all of the ODD factors or a subset of all of the ODD factors; (iv) each micro-ODD 110-122 being associated with a set of one or more safety envelopes; (v) one or more micro-ODDs 110-122 containing a designated "worst-case" point within its boundaries; and (v) the safety envelopes being associated with one or more particular micro-ODDs 110-122 that have been proven or otherwise shown to enforce safe system state spaces for all points within the particular micro-ODD, which can show that the safety envelopes ensure safety at the particular micro-ODD's worst-case point.

As shown in FIG. 3, each of the micro-ODDs 110-122 have one of the plurality of worst-case points 144-156 that can correspond to a particular point within one of the micro-ODDs 110-122. Each of the worst-case points 144-156 can be predetermined to represent the worst-case relative to one or more safety envelopes associated with the corresponding micro-ODD. In certain embodiments, the worst-case points 144-156 are determined when the system is being designed. An exemplary use of a worst-case point (e.g., 144) is that permissiveness of the safety envelope for the associated micro-ODD 110 is set based on the requirements of safety at that particular worst case point 144, assuring that the safety envelope will provide adequate safety for all other points within the corresponding micro-ODD 110 within that micro-ODD's boundary 128.

As an illustrative example, one of the micro-ODDs 110-122 can encompass the following factors: substantially level road grade, substantially no curvature, dry pavement, no expectation of road ice, limited access highway, unlimited visibility, no sensor interference, and no vehicles in the same or adjacent lanes within 1 km. The adjustment of any one of these parameters can result in the system switching to a different micro-ODD, such as a micro-ODD that includes the above-described parameters except for an expectation of road ice due to freezing conditions affecting an upcoming overpass bridge.

The boundaries 128-140 of the micro-ODDS 110-122 can be determined responsive to factors that can include overall stopping capability (e.g., dry vs. wet vs. snow), variation in road surface friction between vehicles (e.g., surface type, ice patches, spills), variations in road slope between vehicles (e.g., lead vehicle uphill with trailing vehicle downhill into a valley), maximum braking capability of leading vehicle (e.g., upgraded from factory brakes), and maximum braking capability of own vehicle (degraded braking capability due to mechanical wear, wet brakes, etc.).

Additional factors for determining the micro-ODD 110-122 boundaries 128-140 can include vehicle weight distribution, tire condition, brake condition, high winds, road surface treatment, illumination (day/night, sun glare), visibility (fog, smoke), additional roadbed specifics (camber, sand, gravel), and any other environmental or ego vehicle factor that affects safety-relevant risk exposure and vehicle capabilities. The factors can be considered in a micro-ODD definition or through worst-case assumption management. Note these factors indicate that setting a micro-ODD can be responsive both to subsetting the ODD as well as subsetting the range of states and capabilities of the ego vehicle.

The entire operational space for a vehicle can be partitioned into a substantial number of micro-ODDs that can correspond to the micro-ODDs 110-122. The micro-ODDs 110-122 can cover the space set forth in FIG. 3 entirely. In such instances, a simplified description of one of the micro-ODDs 110-122 might be "paved road, 50-75 degrees F., dry, less than 1 percent grade, other vehicles brake no more than 1 g, anti-collision radar functional; anti-collision lidar functional; own braking capability above 90% rated capacity, own vehicle speed between 40 and 60 kph."

The micro-ODDs 110-122 have, in general, different sizes and/or shapes. The micro-ODDs 110-122 can be surrounded by other micro-ODDs (e.g., micro-ODD 120 surrounded by micro-ODD 122). In other embodiments, it is also contemplated that the ODD 100 has micro-ODDs 110-122 arranged in a uniform tiling of the space with identically sized and shaped micro-ODDs. In still other embodiments, the micro-ODDs 110-122 are optimized for both efficiency in operation and efficiency in the design process. The optimized approach can produce an irregular, heterogenous arrangement of the micro-ODDs 110-122, as is illustrated in FIG. 3.

Figure 4:
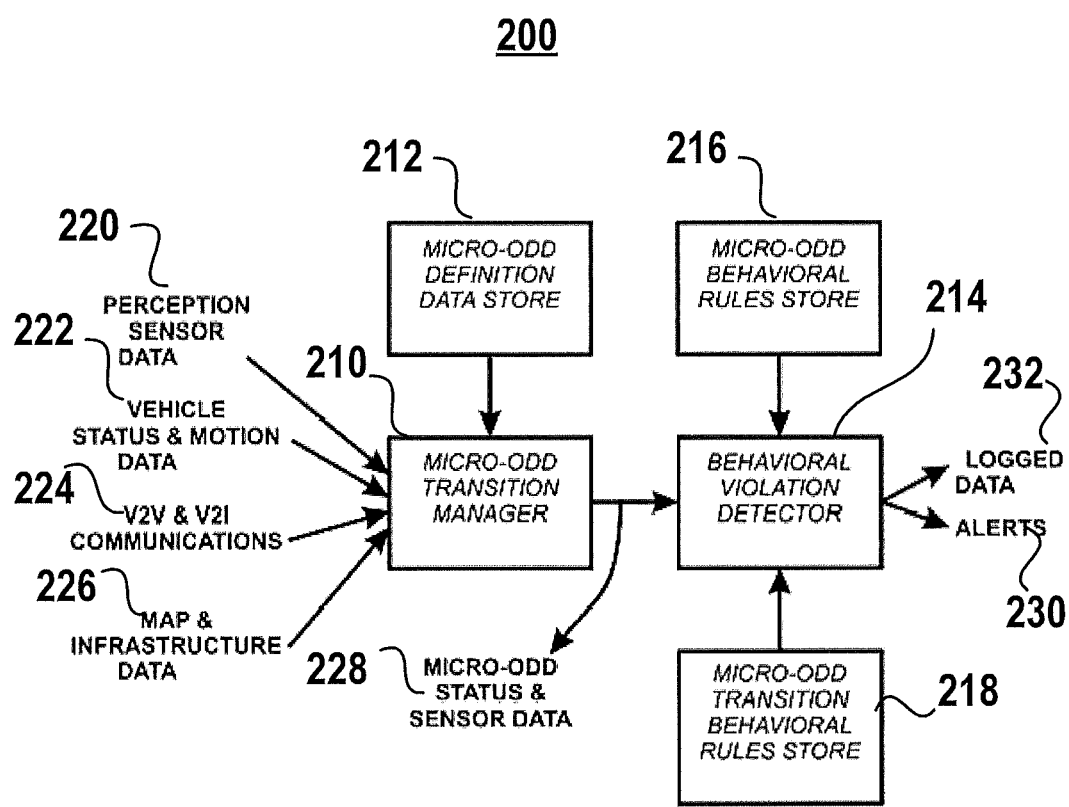
FIG. 4 is a block diagram of a micro-ODD transition manager and behavioral violation detector operating environment.

FIG. 4 illustrates an operating environment, generally designated by the numeral 200, that includes a micro-ODD transition manager 210 coupled to a processing element in the form of micro-ODD definition store 212. The operating environment 200 further includes a processing element in the form of a behavioral violation detector 214 coupled to micro-ODD behavioral rules store 216 and a micro-ODD transition behavioral rules store 218. The micro-ODD transition manager 210 processes perception sensor data inputs 220, vehicle status and motion data inputs 222, vehicle to vehicle and vehicle to infrastructure inputs 224, map and infrastructure inputs 226, and other input and/or sensor data. The micro-ODD transition manager 210 produces micro-ODD status and sensor data 228.

Micro-ODD transition safety is addressed by having a separate set of transition rules stored in the micro-ODD transition behavioral rules store 218. In certain embodiments, the micro-ODD transition behavioral rules store 218 can have pairwise transition rules encoded in XML that specify the starting point and the ending point of one or more particular micro-ODDs.

Further, the micro-ODD transition behavioral rules store 218 can include transition safety envelope and timeliness criteria to accomplish a transition between one or more specified pairs of micro-ODDs. The micro-ODD transitions that do not present compatibility problems can be omitted, which can result in reliance solely on non-transitional micro-ODD rules from the micro-ODD behavioral rules store 216.

In certain embodiments, the changing of a micro-ODD that defines a following distance of 50 meters to one with a following distance of 100 meters can be based on a worst-case assessment. The change can be implemented by creating a transition envelope with a ramped envelope that starts with a fifty meter minimum following distance for one second and increases linearly to a one-hundred meter following distance at five seconds after the start of the transition. Then, the change can be completed to the one-hundred meter following distance non-transitional safety envelope at the end of five seconds.

The proof of safety for such a transition function would depend upon the system design and operational circumstances. For a vehicle-initiated change between micro-ODDs, the safety can be ensured via compatible adjacent micro-ODDs that conform to the intersection of safety envelopes for pre-transition micro-ODDs. For externally imposed micro-ODD transitions (e.g., hitting an unexpected patch of ice in weather that would not normally support ice formation), the transition function permits time-limited best effort restoration of a stable safe operational state space after the ODD has been involuntarily forced out of a proven safe situation.

An alternative method to enable transition between micro-ODDs is to use known ride-through techniques that involve deferring alerts for minor violations of safety envelopes, while the system changes its internal state to conform with safety envelope limitations for a new micro-ODD.

As shown in FIG. 4, the operating environment 200 includes data inputs, such as perception sensor data inputs 220, vehicle status and motion data inputs 222, vehicle to vehicle and vehicle to infrastructure inputs 224, and map and infrastructure inputs 226.

The micro-ODD transition manager 210 can process the perception sensor data inputs 220, the vehicle status and motion data inputs 222, the vehicle to vehicle and vehicle to infrastructure inputs 224, and the map and infrastructure inputs 226, and other input and/or sensor data with its own internal record of the current micro-ODD to compute a new micro-ODD, preferably in a periodic real time basis faster than the time constants of the vehicle (in certain embodiments, every 50 msec). The output of micro-ODD transition manager 210 can include the current micro-ODD from the previous computation cycle, the next micro-ODD from the current computation cycle, and a copy of relevant sensor data that might be needed by other parts of the vehicle and by the behavioral violation detector 214 within the micro-ODD status and sensor data 228.

The behavioral violation detector 214 can compare the micro-ODD status and current sensor data 228 against the appropriate set of safety envelope information. In some embodiments, the behavioral violation detector 214 can access the micro-ODD behavioral rules store 216 for an unchanged micro-ODD and the micro-ODD transition behavioral rules store 218 for a recently changed micro-ODD. The behavioral violation detector 214 tracks micro-ODD changes against time values for transitions and reverts from transition behavioral rules back to non-transition behavioral rules according to the timeline in the transition rules.

If a behavioral rule violation is detected, the operating environment 200 can produce an alert 230 that announces that the system has violated one or more safety envelopes. The operating environment 200 can store logged data 232.

Referring now to FIGS. 3-4, the optimization of the shape of the micro-ODDs 110-122 can be accomplished by considering the most common operational modes of the system and creating comparatively smaller micro-ODDs for common operational modes to increase permissiveness. Larger coarser-grained micro-ODDs are used for unusual operational conditions at the cost of decreased permissiveness. The use of larger coarser-grained micro-ODDs provides the benefit of reduced design and analysis efforts to cover larger portions of the ODD, and can decrease the cost for redundant sensors to the extent that the micro-ODD permits operation with faulty equipment.

In general, the size of the micro-ODDs 110-122 affects the system permissiveness, because larger micro-ODD size encompasses larger areas of the environmental state space. As a result, systems that include larger micro-ODDs can be expected to utilize more pessimistic worst-case assumptions.

Certain embodiments can include one of the micro-ODDs 110-122, such as micro-ODD 110, that has "zero electromagnetic spectrum visibility" (due to visibility impairment, RF interference, equipment failure, or some combination thereof) with all other parameters such as road geometry left unconstrained. In such an embodiment, the micro-ODD 110 could be considered large because it leaves most aspects of the ODD 100 unconstrained and non-permissive.

The micro-ODD 110 in such an embodiment can encompass worst-case hill grade, road curvature, icy pavement, undetected mid-range vehicles, and other similar factors in such embodiments. The vehicle in which the ODD 100 is implemented could be left inching its way forward relying solely upon short-range ultrasonic parking sensor obstacle avoidance. Such operational situations are expected to be very rare, so that the reduced permissiveness associated with such implementations represents an acceptable engineering tradeoff to avoid analysis of the full range of ODD factors in such rare operational scenarios.

Another consideration in the implementation of the ODD 100 shown in FIG. 3 is the transition between the micro-ODDs 110-122. The transition between the micro-ODDs 110-122 involves the management of valid assumptions to simplify safety envelopes and increase permissiveness. In general, some assumptions are favorable while others are unfavorable. For example, in most cases a dry road is more favorable, a wet road is less favorable, and an icy road is least favorable.

The micro-ODDs 110-122 can provide a system, such as the AV control system 14 shown in FIG. 1, with ability to manage safety by transitioning to the most permissive one of the micro-ODDs 110-122 that is compatible with current conditions. For example, the system can operate in a dry road with one of the micro-ODDs 110-122 until water is detected (or a weather service predicts imminent wet roads), and then transition to another one of the micro-ODDs 110-122 that is particularly configured for wet roads.

The utilization of the micro-ODDs 110-122 can simplify the implementation and the validation of a safety envelope checker because such micro-ODDs do not need to account for highly complex physics, vehicle dynamics, and other factors. In some implementations, one of the micro-ODDs 110-122 can be implemented with a lookup table with operational safety parameters enforced by a high-integrity safety envelope checking device. This approach moves potentially complex computations from run-time to design time, with those design time computations determining the worst-case points 144-156 and defining corresponding predetermined safety envelopes for each micro-ODD to be implemented via look-up table.

In another embodiment, the micro-ODDS 110-122 can be configured with a fixed following distance (alternately a following time) that covers all possible situations within each of the micro-ODDs 110-122. Varying the following distance permitted in such an embodiment can be accomplished by transitioning between the micro-ODDs 110-122.

In certain other embodiments, the ODD 100 can be configured using mathematical equations at run-time to enforce safety envelopes, but those equations can be simplified due to the assumptions implicitly encoded into the mechanism through which the ODD 100 selects the micro-ODDs 110-122. In such embodiments, the assumptions that are known to be valid when any particular one of the micro-ODDs 110-122 is implemented can be predetermined or otherwise identified. This results in evaluating reduced order safety envelope equations at run time that can, for example, ignore terms that incorporate environmental factors that are not relevant to the currently active micro-ODD.

This exemplary methodology for optimization of the micro-ODDs 110-122 can include selecting an expected frequent, high-value system operational point, such as a single operating point of 55 mph on an interstate highway in favorable environmental conditions. Then, the size of that micro-ODD state space can be grown, iteratively, by gradually relaxing constraints.

Such an implementation process can involve considering slight inclines, slight visibility reductions, and slight speed changes. For each iteration in the optimization process, a system, such as the AV control system 14 shown in FIG. 1, can determine the worst-case point among the worst-case points 144-156 that puts the tightest constraints on a provably safe safety envelope. When the safety envelope impairs operational efficiency by more than a predetermined threshold, such as 1% decrease in permissible following distance, the system can stop the iteration and freeze the resultant micro-ODD boundary from within the outer boundaries 128-140.

The optimization process can be implemented to create a set of potentially partially or fully overlapping micro-ODDs, such as micro-ODDs 112, 118, and 120, that have the worst-case points 146, 152, and 154, as shown in FIG. 3. Then, another set of micro-ODDS 110 and 114 that include secondary operational points with more generous bounds on cutoff threshold, potentially, can encompass the micro-ODDs 112, 118, and 120. This entire procedure can be repeated with successively less important operational points and successively more generous thresholds until the entire ODD 100 has been encompassed by the set of accumulated micro-ODDs 110-122, or it is deemed that all worthwhile optimization has been completed.

The last step of the optimization can involve creating a worst-case fallback one of the micro-ODDs 110-122 that encompasses the entirety of the ODD 100 that has not otherwise been assigned to the micro-ODD 116.

Once the set of micro-ODDs 110-122 has been constructed in the above-described manner, a list of all micro-ODD boundaries, including outer boundaries 128-140, has been created that as a set encompasses the entire ODD 100. The list is preferably placed in a machine-readable representation of the environmental space (preferably as an XML file) in a micro-ODD definition data store, such as the micro-ODD definition data store 212 shown in FIG. 4.

As shown in FIG. 3, the worst-case points 144-156 were identified during the micro-ODD creation process in conjunction with deriving or otherwise establishing safety envelope definitions. The safety envelope definitions can be derived mathematically using RSS with constraints and assumptions commensurate with the outer boundaries 128-140. Alternatively, the safety envelopes can be developed via simulator-based exploration of the micro-ODD space and/or manually applied heuristics, such as the "2 second rule" for vehicle following distance prevalent in human driver education materials. The resultant safety envelope definitions are preferably placed in a machine-readable representation of the system state space (preferably as an XML file) in a micro-ODD behavioral rules store, such as the micro-ODD behavioral rules store 218 shown in FIG. 4.

In certain embodiments, safe behavior can be defined during the interval of time it takes a system, such as the AV control system 14 shown in FIG. 1, to transition between micro-ODDs 110-122. For example, a vehicle operating in micro-ODD 112 can transition in a single evaluation cycle to either micro-ODD 110 with a slight change to the value along axis 124 or to micro-ODD 114 with a slight change to the value along axis 126. The ability to make such transitions will depend upon the initial location along the axes 124-126 within the micro-ODD 112. Because the micro-ODDs 110-

114 have different worst-case points 144-148, the micro-ODDs 110-114 can be expected to have different safety envelopes as well.

Alternatively, micro-ODDs and worst-case points can be selected with overlapping safety envelopes for such transitions. However, care should be applied when using this approach because a small change in the ODD might result in a comparatively large change in safety envelopes as a boundary is crossed. Such large changes can be desirable when the boundary corresponds to a large change in vehicle operational constraints, such as a small temperature change from above freezing to below freezing temperatures, which can occur in winter driving conditions.

Figure 5:
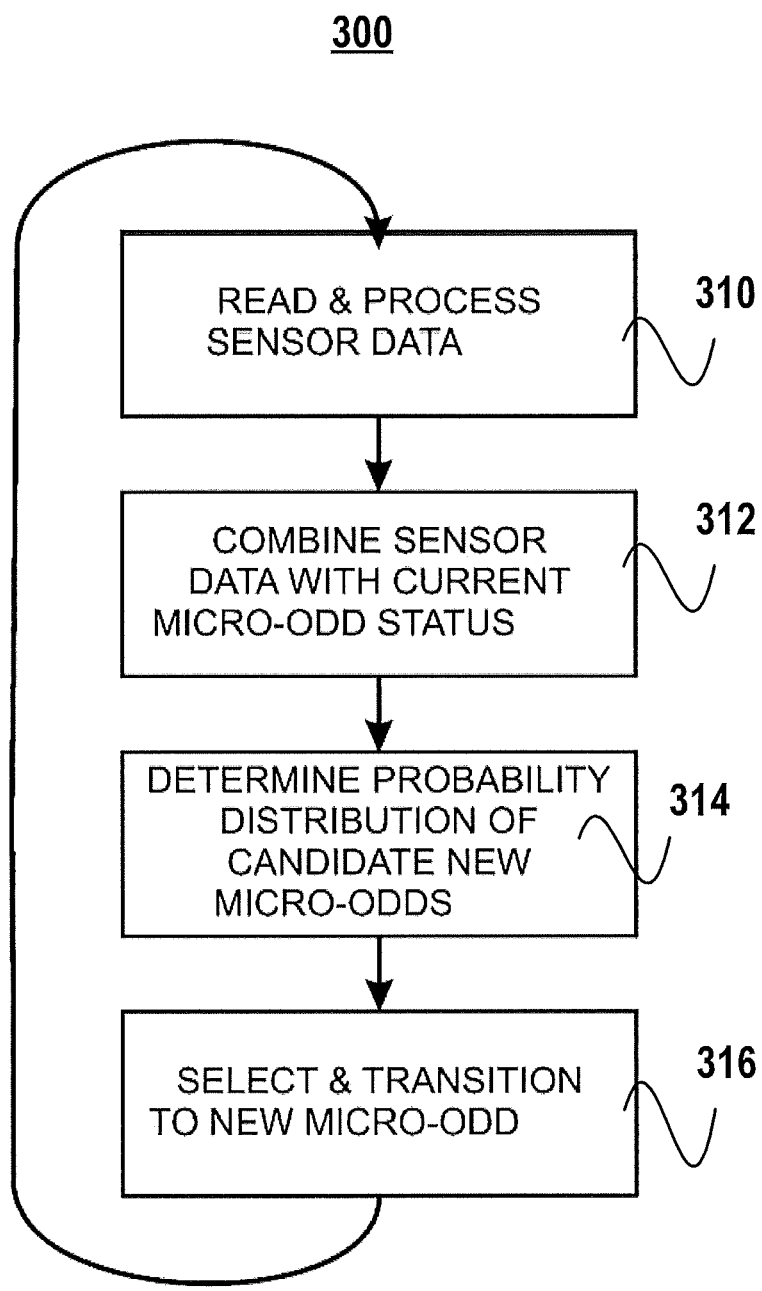
FIG. 5 is a flow chart of an exemplary process for a transition manager in accordance with the disclosure.

FIG. 5 illustrates an exemplary process, generally designated by the number 300, that corresponds to the main computation loop for a micro-ODD transition manager, such as the micro-ODD transition manager 210 shown in FIG. 4. Sensor data is read and processed at Step 310. The current micro-ODD status is combined with that sensor data to compute a new micro-ODD status at Step 312. The probability distribution of candidate new micro-ODDs is determined at Step 314. A new micro-ODD is selected and sent out as part of the micro-ODD status at Step 316, which results in the production of the micro-ODD status and sensor data 228 shown in FIG. 4.

An implication of the micro-ODD approach is that probabilistic data in the sensor inputs, perception algorithm confidence output data, filtered data, and so on are combined into a probabilistic value that is used to select a deterministic micro-ODD. While this enables a firm determination of proofs of safety within a micro-ODD, the selection of the micro-ODD itself is subject to uncertainty and probabilistic aspects of the system operation. Step 314 of the micro-ODD selection uses Bayesian analysis to set prior expectations for the new micro-ODD based on the current micro-ODD and other relevant factors.

In some embodiments, a micro-ODD can be implemented to operate in a school zone during daytime. In such embodiments, the micro-ODD can utilize a prior expectation of a child suddenly running out into the road that is higher than the prior expectation of driving at 3 AM through sparsely populated farm country that is away from buildings. Upon the detection of a perception result of a moderately low confidence of a child entering a street at medium range, the transition to a panic stop micro-ODD could occur. Such transitions are more likely to result from a Bayesian analysis in the first scenario (daytime school zone) as compared to the second scenario (night-time rural area).

Figure 6:
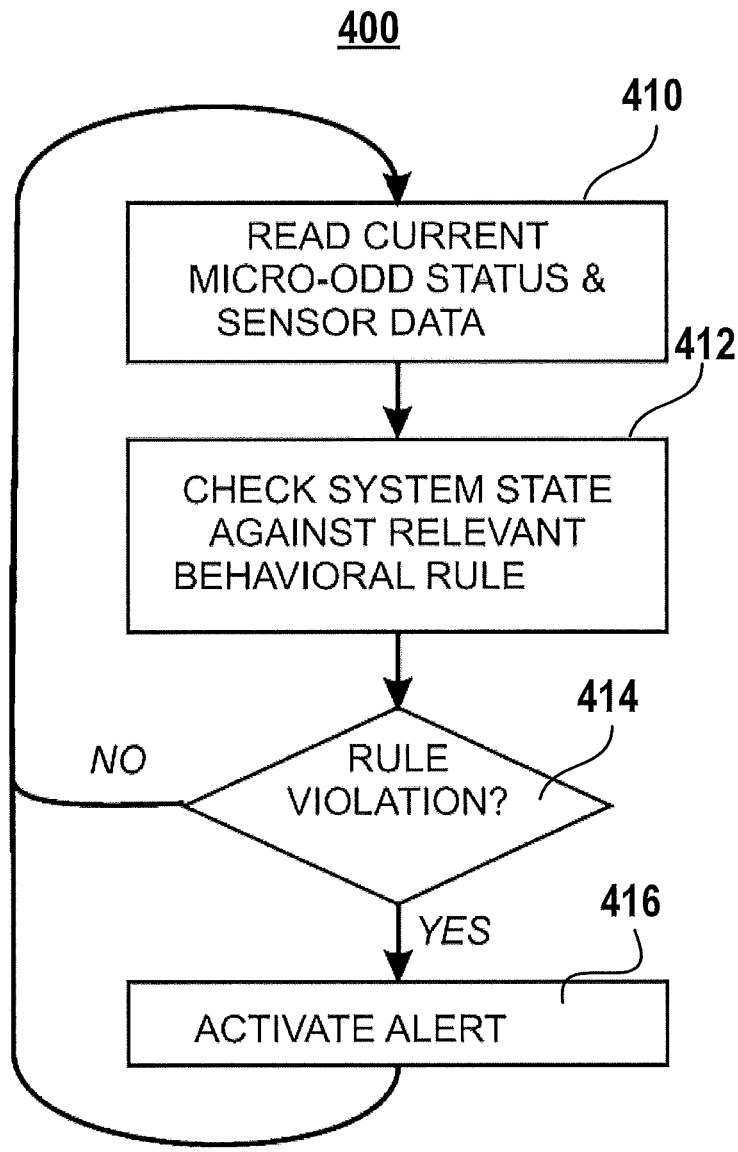
FIG. 6 is a flow chart of an exemplary process for a behavioral violation detector in accordance with the disclosure.

FIG. 6 illustrates an exemplary process, generally designated by the number 400, for the main loop operation of a behavioral violation detector, such as the behavioral violation detector 214 shown in FIG. 4. The behavioral violation detector 214 cooperates with the micro-ODD transition manager 210 shown in FIG. 4. The micro-ODD transition manager 210 and the behavioral violation detector 214 can be implemented by the AV control system 14 within the AV computer system 10 shown in FIG. 1.

The behavioral violation detector periodically reads the micro-ODD status and sensor data from the micro-ODD transition manager in Step 410. In this exemplary embodiment, the micro-ODD transition manager can be the micro-ODD transition manager 210 shown in FIG. 4, the behavioral violation detector can be the behavioral violation detector 214 shown in FIG. 4, the micro-ODD status and sensor data can be the micro-ODD status and sensor data 228 shown in FIG. 4.

The behavioral violation detector checks the system state against a relevant behavioral rule at Step 412. In this exemplary embodiment, the system can be the AV control system 14 shown in FIG. 1.

In Step 412, the behavioral violation detector can compare the system state against safety envelope information from a micro-ODD behavioral rules store for steady-state micro-ODD operation or a micro-ODD transition behavioral rules store during micro-ODD transition intervals if a specific rule is available for the particular transition being performed. In this exemplary embodiment, the micro-ODD behavioral rules store can be the micro-ODD behavioral rules store 216 shown in FIG. 4. The micro-ODD transition behavioral rules store can be the micro-ODD transition behavioral rules store 218 shown in FIG. 4.

The behavioral violation detector can determine whether a safety envelope boundary has been violated in Step 414. When a safety envelope boundary is determined to be violated, the behavioral violation detector can activate an alert in Step 416. In this exemplary embodiment, the alert can correspond to one of the alerts 230 shown in FIG. 4, which can inform the rest of the system that the system has become unsafe.

In some embodiments, the alert produced in Step 416 can activate a vehicle safety capability such as pulling to the side of the road or executing an emergency stop procedure. The alert can be fed back to a micro-ODD transition manager, such as the micro-ODD transition manager 210 shown in FIG. 4, which can force the ODD to transition to an emergency safety micro-ODD to effectively latch the safety event and ensure an orderly and safe system shutdown even when transient safety issues emerge.

While the invention is preferably applied to autonomous vehicles, it is also applicable to entirely human-operated vehicles so long as requisite sensor data is available to inform a micro-ODD transition manager.

Although the present invention has been illustrated and described herein with reference to exemplary embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the claims.

What is claimed is:

1. A computer-implemented method for improving the permissiveness of a vehicle designed to operate within an operational design domain ("ODD") and having an autonomous vehicle control system that collects sensor data, the method comprising:

partitioning at least a portion of the ODD into one or a plurality of micro-ODDs, wherein each micro-ODD represents a different operational situation and includes a worst case point;

calculating a safety envelope for each of the one or a plurality of micro-ODDs, each safety envelope comprising rules for allowable operational characteristics of the vehicle and is modifiable based on the worst case point;

identifying, through the use of at least the sensor data, a current micro-ODD for the vehicle;

expanding the operational environment within a micro-ODD and recalculating the safety envelope;

applying the rules for the safety envelope correlated to the current micro-ODD to the vehicle;

detecting a change in the sensor data;

calculating, based on the change in the sensor data, a new micro-ODD from the plurality of the micro-ODDs; and transitioning from the current micro-ODD to the new micro-ODD.

2. The method of claim 1, further comprising monitoring for a violation of the safety envelope.

3. The method of claim 2, further comprising activating a vehicle safety function.

4. The method of claim 1, further comprising:
using a probabilistic model to assist in determining an appropriate micro-ODD based at least on previously collected data, geographic location, and weather conditions.

5. The method of claim 1,
wherein the sensor data comprise one or more of perception sensor data inputs, vehicle status and motion data inputs, vehicle to vehicle and vehicle to infrastructure inputs, and map and infrastructure inputs.

6. The method of claim 1, wherein the calculating step further comprises performing probabilistic interpretation of the data inputs.

7. The method of claim 1, wherein the transitioning step comprises changing the operational characteristics of the vehicle so that they do not violate safety envelope rules associated with the second micro-ODD.

8. The method of claim 1, wherein the transitioning step comprises linearly changing a relevant operational characteristic from the rules for the safety envelope for the current micro-ODD to rules for a new safety envelope for the new micro-ODD.

9. The method of claim 1, further comprising an optimizing step of expanding the operational environment within a micro-ODD and recalculating the safety envelope.

10. The method of claim 9, in which the optimizing step is repeated until permissiveness is reduced by more than a predetermined threshold.

11. A system for improving the permissiveness of a vehicle designed to operate within an operational design domain ("ODD") and having an autonomous vehicle control system that collects sensor data comprising:
a memory or other data storage facility and one or more processors configured to perform the steps of:
partitioning at least a portion of the ODD into one or a plurality of micro-ODDs, wherein each micro-ODD represents a different operational situation and includes a worst case point;
calculating a safety envelope for each of the one or a plurality of micro-ODDs, each safety envelope comprising rules for allowable operational characteristics of the vehicle and is modifiable based on the worst case point;
identifying, through the use of at least the sensor data, a current micro-ODD for the vehicle;
expanding the operational environment within a micro-ODD and recalculating the safety envelope;
applying the rules for the safety envelope correlated to the current micro-ODD to the vehicle
detecting a change in the sensor data;
calculating, based on the change in the sensor data, a new micro-ODD from the plurality of the micro-ODDs; and
transitioning from the current micro-ODD to the new micro-ODD.

12. The system of claim 11, wherein the memory or other data storage facility and the one or more processors are further configured to perform the step of monitoring for a violation of the safety envelope.

13. The system of claim 12, wherein the memory or other data storage facility and the one or more processors are further configured to perform the step of activating a vehicle safety function in the event of a violation of the safety envelope.

14. The system of claim 11, wherein the memory or other data storage facility and the one or more processors are further configured to perform the step of: using a probabilistic model to assist in determining an appropriate micro-ODD based at least on previously collected data, geographic location, and weather conditions.

15. The system of claim 11, wherein the data inputs comprise one or more of perception sensor-data inputs, vehicle status and motion data inputs, vehicle to vehicle and vehicle to-infrastructure inputs, and map and infrastructure inputs.

16. The system of claim 11, wherein the calculating step further comprises performing probabilistic interpretation of the data inputs.

17. The system of claim 11, wherein the transitioning step comprises changing the operational characteristics of the vehicle so that they do not violate safety envelope rules associated with the second micro-ODD.

18. The system of claim 11, wherein the transitioning step comprises linearly changing a relevant operational characteristic from a first safety envelope rule for the first micro ODD to a second safety envelope rule for the second micro-ODD.

19. The system of claim 11, wherein the memory or other data storage facility and the one or more processors are further configured to perform the optimizing step of expanding the operational environment within a micro-ODD and recalculating the safety envelope.

20. The system of claim 19, wherein the memory or other data storage facility and the one or more processors are further configured to perform the steps of repeating the optimizing step until permissiveness is reduced by more than a predetermined threshold.

21. A non-transient computer-readable storage medium containing instructions that, when executed by a computer, cause the computer to perform a method for improving the permissiveness of a vehicle designed to operate within an operational design domain ("ODD") and having an autonomous vehicle control system that collects sensor data, the method comprising:
partitioning at least a portion of the ODD into one or a plurality of micro-ODDs, wherein each micro-ODD represents a different operational situation and includes a boundary and a worst case point;
calculating a safety envelope for each of the one or a plurality of micro-ODDs, each safety envelope comprising rules for allowable operational characteristics of the vehicle and is modifiable based on the worst case point in relation to the boundary;
identifying, through the use of at least the sensor data, a current micro-ODD for the vehicle;
applying the rules for the safety envelope correlated to the current micro-ODD to the vehicle;
expanding the operational environment within a micro-ODD and recalculating the safety envelope;
detecting a change in the sensor data;
calculating, based on the change in the sensor data, a new micro-ODD from the plurality of the micro-ODDs; and
transitioning from the current micro-ODD to the new micro-ODD.

22. The storage medium of claim 21 containing instructions that, when executed by a computer, cause the computer to perform a method further comprising the optimizing step of expanding the operational environment within a micro-ODD and recalculating the safety envelope.

23. The storage medium of claim 22 containing instructions that, when executed by a computer, cause the computer to perform a method further comprising repeating the optimizing step until permissiveness is reduced by more than a predetermined threshold.

* * * * *